Oct. 12, 1937.   C. E. BRADSHAW   2,095,517
EYESHIELD
Filed Oct. 27, 1936
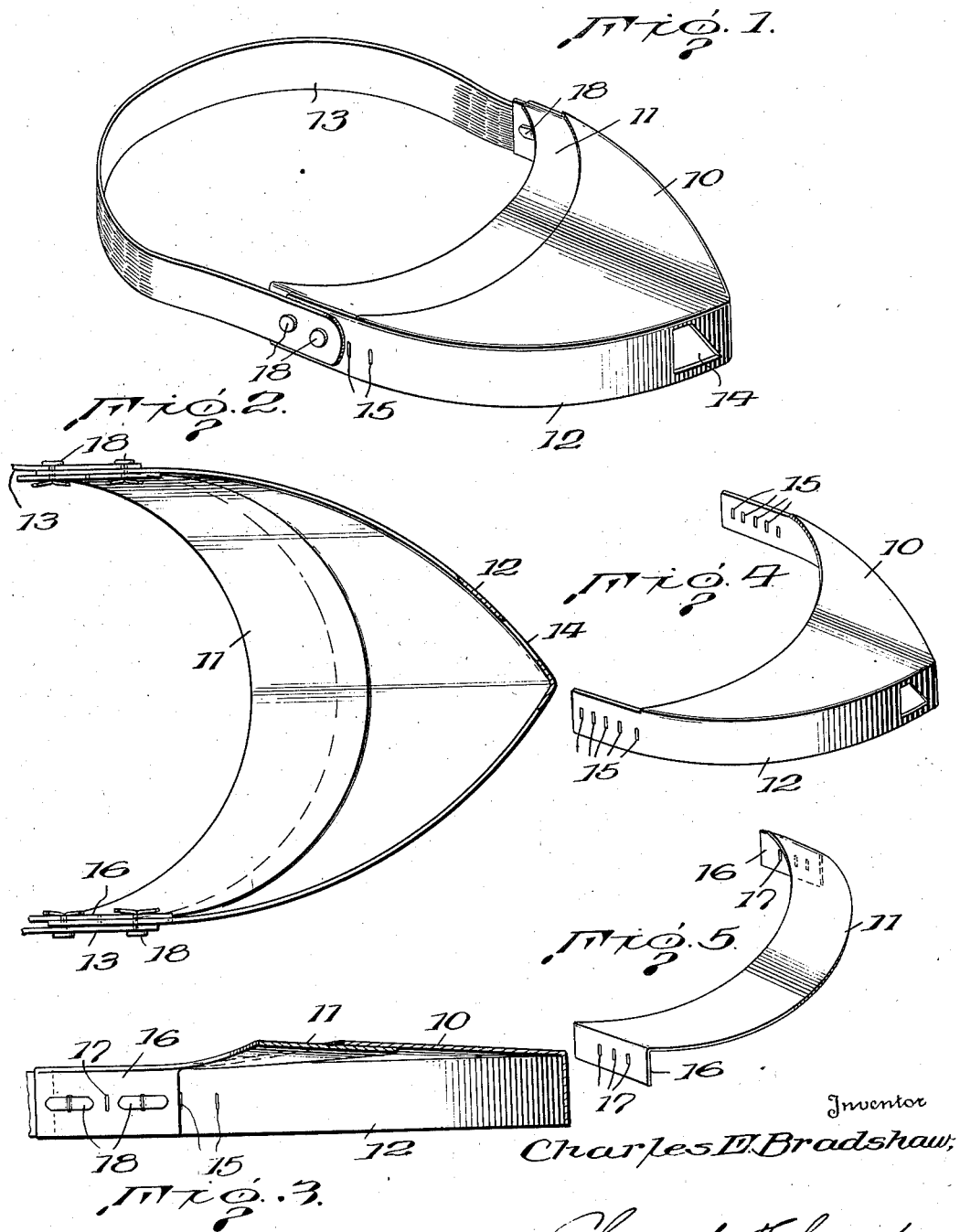

Patented Oct. 12, 1937

2,095,517

UNITED STATES PATENT OFFICE 2,095,517

EYESHIELD

Charles E. Bradshaw, Wellville, Va., assignor of one-half to Charles Martin, Wellville, Va.

Application October 27, 1936, Serial No. 107,872

4 Claims. (Cl. 2—12)

This invention relates to improvements in eye-shields especially adapted for use by drivers of vehicles at night to prevent interference with their vision from the headlights of approaching vehicles.

One object of the invention is to provide a shield which will absolutely preclude rays of light from an approaching vehicle interfering with the wearer's vision.

Another object is to provide an eye-shield of this type which can be readily adjusted to properly fit various individuals.

A still further object is to produce an eye-shield of this type which is of simple design and which can be produced at relatively low manufacturing costs.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a perspective view showing a shield in which the preferred embodiment of the present invention is incorporated;

Fig. 2 is a plan view of the shield inverted, a portion of the visor flange being broken away to show the sight opening;

Fig. 3 is a vertical longitudinal sectional view of the shield, this view being taken centrally of the shield;

Fig. 4 is a perspective view of the so-called visor portion of the shield; and

Fig. 5 is a similar view of the head-engaging portion of the shield.

The present shield comprises a visor 10 and, preferably, a head-engaging portion 11 which, in effect, forms a continuation of the visor 10. These members are adapted to be secured to the head of the wearer or driver in such position that the flange 12, depending from the visor, will be positioned immediately above the driver's normal line of vision. For securing the visor to the driver's head, various means may be employed, but, in the present instance, there is illustrated a head-encircling band 13 attached at its forward ends to the visor 10.

In order to completely block off from the driver's eyes rays of light emanating from an approaching vehicle, the side edges of visor 10 converge forwardly of the visor, so that the latter may be said to be of substantially V-shape. The flange 12, of course, follows the edge of the visor and, in order to completely shut out the rays of light of an approaching vehicle, the flange at one side of the visor is imperforate but, at the other side, there is formed a sight opening 14, somewhat adjacent the point of convergence of the flange at the side edges of the visor. Preferably, this sight opening is of less width at the top than at the bottom but, as will be noted, said opening is located at one side of the tip of the visor. For instance, where the shield is to be used in those localities where vehicles drive along the right-hand side of roadways, the sight opening will be on the right-hand side of the visor, so that a driver wearing the shield may tilt his head slightly forward upon the approach of a vehicle, the tilting action lowering the flange 12 to a point where the imperforate side of the flange, which would be toward the side at which the approaching vehicle passes, will completely block out rays of light emanating from such vehicle. However, the driver's vision of the road and, particularly, the right-hand portion of the road, will not be obstructed, because, in the present shield, the single opening 14 is located at the focal point of the wearer's eyes. In other words, the distance of the forward portion of the visor, or rather the opening 14, from the wearer's eyes, is such that he may view the right-hand portion of the road with both eyes open and, at the same time, the fact that a single sight opening is used, permits the flange at the side of the visor toward the approaching vehicle to be made imperforate and thus insures a complete blocking-off of the light rays from the head-lights of that vehicle.

As previously mentioned, what might be called the visor proper is composed of the two sections 10, 11, this being the preferred construction, in order to provide for adjustment of the sight opening relatively to the wearer's face. Any type of connection which will permit of adjustment of sections 10, 11, can be used but, in the present instance, the ends of the flange 12 are shown as being provided with a series of openings or slots 15, and section 11 is formed with depending tab-like portions 16 slotted at 17, one or more slots of the flange 12 and tabs 16 being adapted to be positioned in registry with one another, and the sections 10 and 11 clipped together by detachable securing elements 18, these elements 18 also preferably being used for securing the head band 13 to the visor. As will be readily understood, the head space defined by the band 13 and section 11 may be varied by adjusting the head band with respect to sections 11, 10, while, on the other hand, the spacing of the sight opening 14 with respect to the wearer's eyes may be altered by adjusting section 10 with respect to section 11. Likewise, the head space defined by band 13 and section 11 of the shield, can be altered by adjusting section 11 with respect to section 10. Various types of fastening elements may be used for securing the head band, section 11 and section 10 together, but, in the present instance, the elements 18 are shown as being in the form of bifurcated fasteners adapted to be passed through the slots 15, 17, and the bifurcations bent over to secure the parts together, the bifurcations being flexible in order that they may be bent straight and withdrawn in order to permit of any of the adjustments just described.

As will be apparent, the present shield is of very simple construction and can, therefore, be produced at comparatively low cost. Nevertheless, it is very efficient, by reason of the fact that the side of the visor which normally would be positioned toward an approaching vehicle is imperforate and the single sight opening is located at a point which might be defined as being behind the imperforate portion of flange 12. This fact absolutely precludes the light rays of an approaching vehicle interfering with the driver's vision when the driver tilts his head forwardly to a point where the imperforate side of the flange 12 blocks off those light rays. Another feature is the fact that the adjustability of the several members constituting the shield permits it to be readily adjusted to properly fit anyone who may choose to use it.

What I claim is:

1. An eye-shield comprising a depending flange extending along the sides and converging to a point at the front of the shield, and a single sight opening in said flange, said opening being located at one side of said point of convergence whereby light rays emanating from a point in advance of the side of the flange opposite said point of convergence cannot pass through said sight opening.

2. An eye-shield comprising a head engaging portion, a visor and a depending flange extending along the sides of said visor and converging to a point at the front thereof, said flange being imperforate at one side of said point of convergence and having a sight opening therein located at the opposite side of said point of convergence whereby light rays directed toward the shield from a point in advance of the imperforate side of the flange cannot enter said sight opening, said head engaging portion and visor being adjustable relatively to each other to adjust said sight opening with respect to the wearer's eyes.

3. An eye-shield comprising a visor of substantially V-shape, a depending flange extending along the edge of the forward portion thereof, the portion of the flange at one side of the visor being imperforate and the flange at the other side having a sight opening therein adapted to be positioned at the focal point of the wearer's eyes, said sight opening being located at a point rearwardly of the forward extremity of the imperforate side of the flange.

4. In an eye-shield, head-engaging portion, a visor projecting therefrom, a depending flange on said visor adapted to be normally positioned above the wearer's line of vision, said flange being of V-shape in horizontal cross-section and having a single opening therein adapted to be positioned at the focal point of the wearer's eyes by the wearer tilting his head forwardly, said sight opening being located at a point rearwardly of the junction point of the two sides of the flange and means for adjusting the head engaging portion and said visor toward and from each other.

CHARLES E. BRADSHAW.